United States Patent
Kim et al.

(10) Patent No.: US 8,673,258 B2
(45) Date of Patent: *Mar. 18, 2014

(54) ENHANCED CARBON NANOTUBE

(75) Inventors: Yong Hyup Kim, Seoul (KR); Eui Yun Jang, Seoul (KR)

(73) Assignee: SNU R&DB Foundation, Seoul (KR)

( * ) Notice: Subject to any disclaimer, the term of this patent is extended or adjusted under 35 U.S.C. 154(b) by 767 days.

This patent is subject to a terminal disclaimer.

(21) Appl. No.: 12/192,024

(22) Filed: Aug. 14, 2008

(65) Prior Publication Data
US 2010/0040529 A1    Feb. 18, 2010

(51) Int. Cl.
*D02G 3/00* (2006.01)
*B05D 1/36* (2006.01)

(52) U.S. Cl.
USPC ........... 423/447.2; 205/78; 427/409; 428/367

(58) Field of Classification Search
USPC .......................................... 205/78; 423/447.2
See application file for complete search history.

(56) References Cited

U.S. PATENT DOCUMENTS

| | | | |
|---|---|---|---|
| 4,841,786 A | 6/1989 | Schulz | |
| 5,763,879 A * | 6/1998 | Zimmer et al. | 850/3 |
| 5,948,360 A | 9/1999 | Rao et al. | |
| 6,781,166 B2 | 8/2004 | Lieber et al. | |
| 6,852,266 B2 | 2/2005 | Robinson et al. | |
| 6,905,667 B1 | 6/2005 | Chen et al. | |
| 7,048,903 B2 | 5/2006 | Colbert et al. | |
| 7,054,064 B2 | 5/2006 | Jiang et al. | |
| 7,147,894 B2 | 12/2006 | Zhou et al. | |
| 7,164,209 B1 | 1/2007 | Duan et al. | |
| 7,288,317 B2 | 10/2007 | Poulin et al. | |
| 7,385,295 B2 | 6/2008 | Son et al. | |
| 2002/0014667 A1 | 2/2002 | Shin et al. | |
| 2002/0069505 A1 | 6/2002 | Nakayama et al. | |
| 2002/0127162 A1 | 9/2002 | Smalley et al. | |
| 2003/0122111 A1 | 7/2003 | Glatkowski | |
| 2003/0161950 A1 | 8/2003 | Ajayan et al. | |
| 2004/0053780 A1 | 3/2004 | Jiang et al. | |
| 2004/0173378 A1 | 9/2004 | Zhou et al. | |
| 2004/0265550 A1 | 12/2004 | Glatkowski et al. | |
| 2005/0096729 A1 | 5/2005 | Donadio, III | |
| 2005/0238810 A1 | 10/2005 | Scaringe et al. | |

(Continued)

FOREIGN PATENT DOCUMENTS

| | | |
|---|---|---|
| CN | 1849181 A | 10/2006 |
| DE | 69728410 T2 | 12/1998 |

(Continued)

OTHER PUBLICATIONS

Li et al. "Direct Spinning of Carbon Nanotube Fibers from Chemical Vapor Deposition Synthesis", Science, 304, 2004, 276-278.*
Brioude et al. "Synthesis of sheathed carbon nanotube tips by the sol-gel technique", Applied Surface Science, 221, 2004, 4-9.*
Dong et al. "Synthesis, assembly and device of 1-dimentional nanostructures", Chinese Science Bulletin, 47(14), 2002, 1149-1157.*
Goldstein et al., "Zero TCR Foil Resistor Ten Fold Improvement in Temperature Coefficient", Electronic Components and Tech. Conf., IEEE, 2001.

(Continued)

*Primary Examiner* — Rebecca Lee
(74) *Attorney, Agent, or Firm* — Knobbe Martens Olson & Bear LLP

(57) ABSTRACT

Techniques for manufacturing an enhanced carbon nanotube (CNT) assembly are provided. In one embodiment, a method of manufacturing an enhanced CNT assembly comprises preparing a metal tip, preparing a CNT plus transition-metal colloidal solution, forming a CNT plus transition-metal composite assembly by using the prepared metal tip and CNT plus transition-metal colloidal solution, and growing the CNT plus transition-metal composite assembly.

17 Claims, 8 Drawing Sheets

(56) References Cited

U.S. PATENT DOCUMENTS

| | | | |
|---|---|---|---|
| 2006/0060825 A1 | 3/2006 | Glatkowski | |
| 2006/0099135 A1 | 5/2006 | Yodh et al. | |
| 2006/0113510 A1 | 6/2006 | Luo et al. | |
| 2006/0133982 A1 | 6/2006 | Kinloch et al. | |
| 2006/0274047 A1 | 12/2006 | Spath et al. | |
| 2006/0274048 A1 | 12/2006 | Spath et al. | |
| 2007/0007142 A1* | 1/2007 | Zhou et al. | 205/78 |
| 2007/0014148 A1 | 1/2007 | Zhou et al. | |
| 2007/0020458 A1 | 1/2007 | Su et al. | |
| 2007/0030871 A1 | 2/2007 | Lee | |
| 2007/0045119 A1 | 3/2007 | Sandhu | |
| 2007/0243124 A1 | 10/2007 | Baughman et al. | |
| 2007/0248528 A1* | 10/2007 | Kim | 423/447.1 |
| 2008/0000773 A1 | 1/2008 | Lee et al. | |
| 2008/0044651 A1 | 2/2008 | Douglas | |
| 2008/0044775 A1 | 2/2008 | Hong et al. | |
| 2008/0048996 A1 | 2/2008 | Hu et al. | |
| 2008/0088219 A1 | 4/2008 | Yoon et al. | |
| 2008/0171193 A1 | 7/2008 | Yi et al. | |
| 2008/0290020 A1 | 11/2008 | Marand et al. | |
| 2009/0059535 A1 | 3/2009 | Kim et al. | |
| 2010/0140097 A1 | 6/2010 | Wei et al. | |

FOREIGN PATENT DOCUMENTS

| | | |
|---|---|---|
| JP | 2002301700 A | 10/2002 |
| JP | 2005061859 A | 3/2005 |
| JP | 2005255985 A | 9/2005 |
| JP | 2006513048 A | 4/2006 |
| JP | 3868914 B2 | 1/2007 |
| JP | 2008103329 A | 5/2008 |
| JP | 2008177165 A | 7/2008 |
| KR | 1020050097711 | 10/2005 |
| KR | 1020070072222 A | 7/2007 |
| KR | 1020070112733 | 11/2007 |
| KR | 1020080063194 A | 7/2008 |
| KR | 10-1085276 | 11/2011 |

OTHER PUBLICATIONS

Hulman et al., The dielectrophoretic attachment of nanotube fibres on tungsten needles, Mar. 6, 2007, Nanotechnology, 18, 1-5.

Im, et al., "Directed-assembly of Single-walled Carbon Nanotubes Using Self-assembled Monolayer Patterns Comprising Conjugated Molecular Wires," *Nanotechnology*, (2006) vol. 17: pp. 3569-3573.

International Search Report dated Mar. 5, 2009 for corresponding PCT Application No. PCT/KR2008/007144 filed Dec. 3, 2008.

International Written Opinion dated Mar. 5, 2009 for corresponding PCT Application No. PCT/KR2008/007144 filed Dec. 3, 2008.

Jiang et al., "Spinning continuous carbon nanotube yarns", Nature, vol. 419, 801 (2002).

Kaempgen et al., "Transparent carbon nanotube coatings," Applied Surface Science 252; pp. 425-429 (2005).

Kang et al., "Sandwich-Type Laminated Nanocomposites Developed by Selective Dip-Coating of Carbon Nanotubes", Adv. Mater., 19, 427-432 (2007).

Ko et al., "Electrospinning of Continuous Carbon Nanotube-Filled Nanofiber Yarns", Adv. Mater., 15, No. 14, pp. 1161-1165 (2003).

Kumar et al., "Search for a novel zero thermal expansion material: dilatometry of the AgI-CuI system", J. Mater Sci. 41, pp. 3861-3865 (2006).

Kwon et al., "Thermal Contraction of Carbon Fullerenes and Nanotubes", Phy. Rev. Lett., vol. 92, No. 1, pp. 015901-015904 (2004).

Kwon, "Computational Modeling and Applications of Carbon Nanotube Devices", NSI Workshop Series—IV, Jul. 11, 2007.

Lee et al., "Linker-free directed assembly of high-performance integrated devices based on nanotubes and nanowires", Nature Nanotechnology, vol. 1, pp. 66-71, Oct. 2006.

Lewenstein, et al., "High-yield Selective Placement of Carbon Nanotubes on Pre-patterned Electrodes," *NanoLetters*, (2002) vol. 2, Issue (5): pp. 443-446.

Liu et al., "Controlled deposition of individual single-walled carbon nanotubes on chemically functonalize templates," Chemical Physicas Letters, Apr. 2, 1999, 303, 125-129.

Liu et al., "Controlled Growth of Super-Aligned Carbon Nanotube Arrays for Spinning Continuous Unidirectional Sheets with Tunable Physical Properties", Nano Letters, vol. 8, No. 2, pp. 700-705 (2008).

Ma et al., "Directly Synthesized Strong, Highly Conducting, Transparent Single-Walled Carbon Nanotube Films", Nano Letters, vol. 7, No. 8, pp. 2307-2311 (2007).

Nakagawa, et al., "Controlled Deposition of Silicon Nanowires on Chemically Patterned Substrate by Capillary Force Using a Blade-coating Method," *J. Phys. Chem.*, (2008) vol. 112: pp. 5390-5396.

Rao et al., "Large-scale assembly of carbon nanotubes", Nature, vol. 425, pp. 36-37, Sep. 4, 2003.

Wang et al., "Controlling the shape, orientation, and linkage of carbon nanotube features with nano affinity templates", PNAS, vol. 103, No. 7, pp. 2026-2031 (2006).

Zhang et al., "Multifunctional Carbon Nanotube Yarns by Downsizing an Ancient Technology", Science, vol. 306, 1358-1361 (2004).

Annamalai, et al., "Electrophoretic drawing of continuous fibers of single-walled carbon nanotubes," *J. Appl. Phys.*, 98 114307-1 through 114307-6 (2005).

Kornev, et al., "Ribbon-to-Fiber Transformation in the Process of Spinning of Carbon-Nanotube Dispersion," *Physical Review Letters*, 97, 188303-1 through 188303-4, 2006.

Poulin, et al., "Films and fibers of oriented single wall nanotubes," *Carbon*, 40 (2002) pp. 1741-1749.

Tang, et al., "Assembly of 1D Nanostructures into Sub-micrometer Diameter Fibrils with Controlled and Variable Length by Dielectrophoresis," *Adv. Mater.*, 15, No. 16, pp. 1352-1355, 2003.

Office Action dated Sep. 18, 2009 from U.S. Appl. No. 12/195,347, filed Aug. 20, 2008.

Office Action dated Jan. 28, 2010 from U.S. Appl. No. 12/195,347, filed Aug. 20, 2008.

Office Action dated Nov. 15, 2010 from U.S. Appl. No. 12/195,347, filed Aug. 20, 2008.

Office Action dated Jul. 20, 2009 from U.S. Appl. No. 12/198,835, filed Aug. 26, 2008.

Office Action dated Feb. 2, 2010 from U.S. Appl. No. 12/198,835, filed Aug. 26, 2008.

Office Action dated Jun. 18, 2010 from U.S. Appl. No. 12/198,835, filed Aug. 26, 2008.

Office Action dated Oct. 4, 2010 from U.S. Appl. No. 12/198,835, filed Aug. 26, 2008.

Office Action dated Mar. 24, 2009 from U.S. Appl. No. 12/198,815, filed Aug. 26, 2008.

Office Action dated Oct. 28, 2009 from U.S. Appl. No. 12/198,815, filed Aug. 26, 2008.

Office Action dated May 17, 2010 from U.S. Appl. No. 12/198,815, filed Aug. 26, 2008.

Office Action dated Dec. 8, 2010 from U.S. Appl. No. 12/198,815, filed Aug. 26, 2008.

Letters of Patent for Korean Patent No. 10-1085276, 2011.

Arnold, M.S., et al., "Sorting carbon nanotubes by electronic structure using density differentiation," Nature Nanotechnology, vol. 1, pp. 60-65 (2006).

Carroll, D.L., et al., "Polymer-nanotube composites for transparent, conducting thin films," Synthetic Metals, vol. 155, Issue 3, pp. 694-697 (2005).

Li, M-K., et al., "The Synthesis of MWNTs/SWNTs Multiple Phase Nanowire Arrays in Porous Anodic Aluminum Oxide Templates," Materials Science and Engineering: A, vol. 354, Issue 1-2, pp. 92-96 (2003).

Song, Y.L., et al., "Fabrication of Carbon Nanotube Field Emitters Using a Dip-Coating Method," Chemical Vapor Deposition, vol. 12, pp. 375-379, Wiley-Vch Verlag GmbH & Co., (2006).

Valentini, L., and Kenny, J.M., "Novel approaches to developing carbon nanotube based polymer composites: fundamental studies and nanotech applications," Polymer, vol. 46, Issue 17, pp. 6715-6718 (2005).

* cited by examiner

ENHANCED CARBON NANOTUBE

TECHNICAL FIELD

The described technology generally relates to carbon nanotubes ("CNTs").

BACKGROUND

CNTs are one-dimensional nano-materials that exhibit unique electrical properties. Such unique properties allow them to be potentially useful in various fields such as nanotechnology, electronics, optics, etc. For example, CNTs are widely used in micro devices such as integrated circuits, electrical connectors used in semiconductor chips in computers, batteries, high-frequency antennas, scanning tunnel microscopes, atomic force microscopes, scanning probe microscopes, etc.

However, it is difficult to control an individual CNT due to its nano-size geometry and powder form. Thus, macroscopic applications relying on CNTs have limitations in terms of marketability and commercial feasibility. In order to solve this problem, significant research efforts have been made with respect to the formation of macroscopic building blocks using CNTs. Moreover, various studies were conducted to further understand CNTs so as to expand their applications into numerous fields.

By way of an example, the present inventors partially succeeded in synthesizing the macroscopic one-dimensional CNT assemblies from CNT colloidal solutions via a dip-coating method. However, it was found that each of the CNTs in the assembly adhered to neighboring CNTs by a relatively weak van der Waals force. Thus, the CNT assembly was easily broken when a mechanical force was applied. As such, there still exists a need to improve the mechanical property of the CNT assembly.

SUMMARY

Techniques for manufacturing an enhanced CNT assembly are provided. In one embodiment, a method of manufacturing an enhanced CNT assembly comprises preparing a metal tip, preparing a CNT plus transition-metal colloidal solution, forming a CNT plus transition-metal composite assembly by using the prepared metal tip and CNT plus transition-metal colloidal solution, and growing the CNT plus transition-metal composite assembly.

In another embodiment, a method of manufacturing an enhanced CNT assembly comprises forming a CNT composite assembly comprising CNTs and particles of a transition metal, and growing the CNT composite assembly. The growth of the CNT composite assembly is facilitated by the particles of the transition metal.

This summary is provided to introduce a selection of concepts in a simplified form that are further described below in the Detailed Description. The Summary is not intended to identify key features or essential features of the claimed subject matter, nor is it intended to be used to limit the scope of the claimed subject matter.

DETAILED DESCRIPTION

Figure 1:
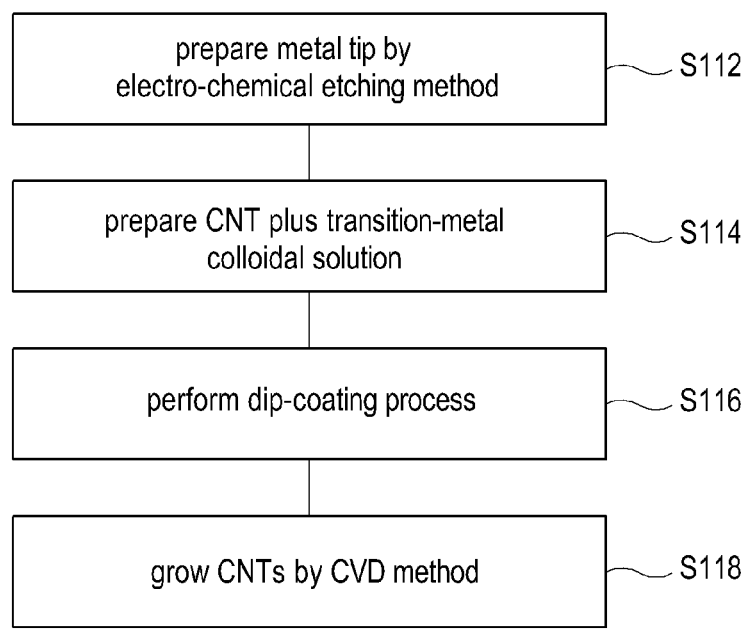
FIG. 1 shows a flowchart for providing an enhanced CNT assembly in one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the components of the present disclosure, as generally described herein, and illustrated in the Figures, may be arranged, substituted, combined, and designed in a wide variety of different configurations, all of which are explicitly contemplated and make part of this disclosure.

FIG. 1 shows a flowchart for providing an enhanced CNT assembly in one embodiment. As depicted in FIG. 1, a metal tip is prepared at block S112. A CNT plus transition-metal colloidal solution is then prepared at block S114. By using the prepared metal tip and CNT plus transition-metal colloidal solution, a dip-coating process for manufacturing a CNT plus transition-metal composite assembly is conducted at block S116. Thereafter, the manufactured CNT plus transition-metal composite assembly is grown at block S118. Each of the blocks S112, S114, S116 and S118 will be further discussed below.

Metal Tip Preparation Block

In this block, a metal tip having a sharp apex is prepared for use in a dip-coating process, as will be further described below. In one embodiment, the metal tip material may comprise tungsten, tungsten alloy, platinum, platinum alloy and the like. For example, a tungsten (W) rod having good wettability with the CNT solution may be used as a metal tip. In one embodiment, the metal tip is prepared by using an electrochemical etching method.

Figure 2:
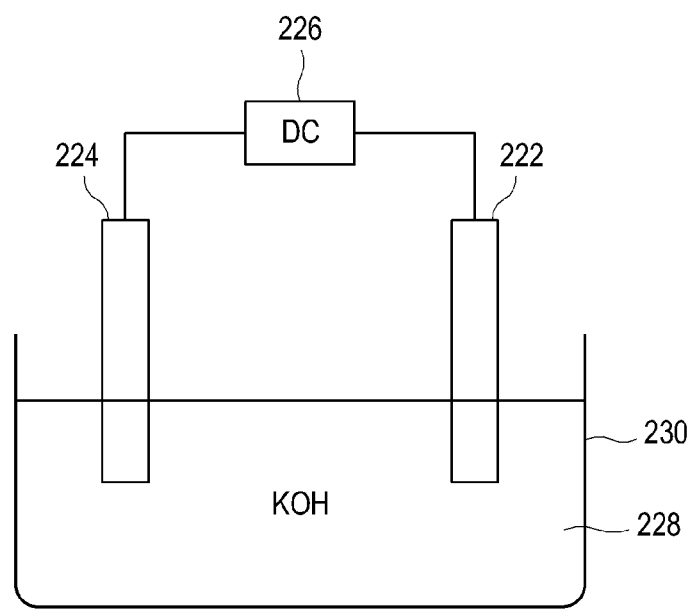
FIG. 2 illustrates an electrochemical etching process of a metal tip in one embodiment.

FIG. 2 illustrates an electrochemical etching process of a metal tip in one embodiment. As depicted, a tungsten rod 222 and a platinum rod 224 may be used as an anode and a cathode, respectively, for the electrochemical etching. A suitable voltage from a DC power source 226 may be applied between the tungsten rod 222 and the platinum rod 224. As shown in FIG. 2, the tungsten rod 222 and the platinum rod 224 are immersed in an electrolyte contained in a vessel 230. For example, KOH (potassium hydroxide) or NaOH (sodium hydroxide) solution may be used as the electrolyte. The application of a predetermined voltage between the tungsten rod 222 and the platinum rod 224, which are immersed in KOH solution 228, results in the following anodic oxidation reaction.

The tungsten rod 222 is etched as the anodic oxidation reaction proceeds. Accordingly, a tungsten tip with a sharp apex is manufactured.

Figure 3:
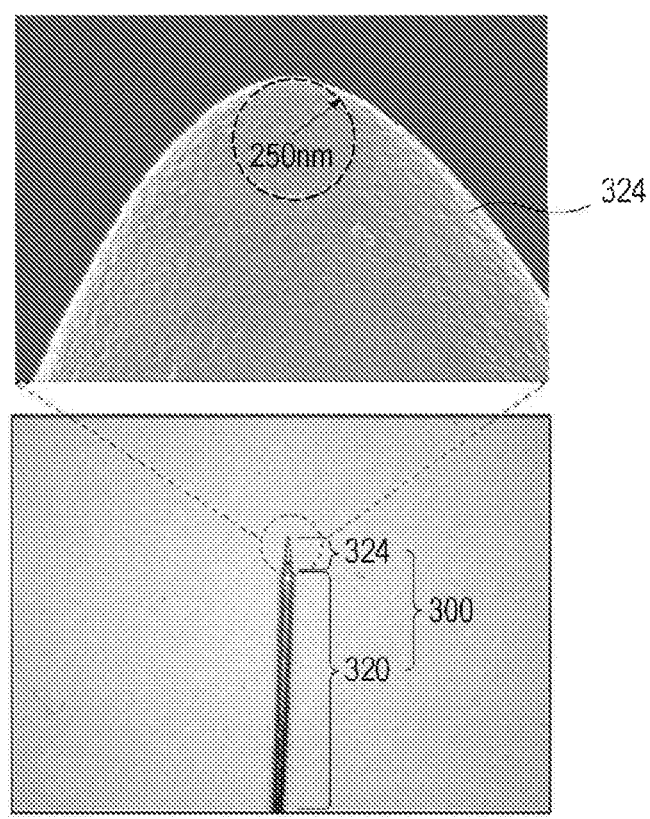
FIG. 3 shows photographs of one example of a manufactured tungsten tip in one embodiment.

FIG. 3 shows photographs of one example of the manufactured tungsten tip in accordance with one embodiment. A tungsten tip 300 includes a body portion 320 and an apex portion 324. The apex portion 324 of the tungsten tip 300 in the example illustrated in FIG. 3 has a radius of approximately 250 nm and forms a sharp conical shape. The radius of the apex portion 324 may vary from tens of nanometers to hundreds of nanometers. The sharpness of a tip is related to the radius of curvature of the cone shape of the tip. That is, the tip becomes more sharpened as the radius of curvature decreases. In terms of improving the yield of CNT ropes, it may be beneficial to make the tip as sharp as possible. The sharpness of the tip is also related to the length and diameter of the one. The shape and final diameter of the tungsten tip may be determined by the immersion depth and applied current.

CNT Plus Transition-Metal Preparation Block

A process of preparing a CNT plus transition-metal colloidal solution is now described. Ni, Co, Fe, etc. may be used as a transition metal. As described below, the transition metals promote the growth of CNTs in the growing process by causing CNTs to become tangled around the particles of the transition metal. In one embodiment, the CNT plus transition-metal colloidal solution may be prepared by conducting ultrasonication treatment upon the purified CNT powders and transition metal.

The process of preparing the purified CNT powders is now further described. The purified CNT powders may be prepared by using, for example, SWNT (single-walled nanotube) products such as ASP-100F produced by Iljin Nanotech. SWNTs may be sonicated in a nitric acid at 50° C. for approximately 30 minutes so that SWNTs are purified and simultaneously exfoliated from their bundles. SWNTs may be neutralized with de-ionized (DI) water and then become trapped on the membrane filter (Millipore, 0.2 μm pore size, 47 mm diameter) by using a vacuum filtration method. In one embodiment, SWNTs on the filter are dried in a vacuum oven chamber at 80° C. for approximately 48 hours. As a result, the purified SWNT powders are obtained. The obtained SWNT powders are dispersed in a predetermined solvent to make a SWNT colloidal solution. In accordance with selected embodiments, water, N,N-DMF (dimethyl formamide) or any other suitable organic solutions may be used as the solvent into which SWNT powders are dispersed.

The transition metal powders are also used to prepare the CNT plus transition-metal colloidal solution. In one embodiment, Ni may be used as a transition metal to form the CNT plus Ni colloidal solution. Ni powders may be commercially available or can be manufactured by any suitable method such as, by way of example, a microwave-assisted combustion method. In one embodiment, the sonication treatment is conducted upon the SWNT colloidal solution and Ni powders so that the well-dispersed and stable CNT plus Ni colloidal solution may be formed.

Dip-Coating Block

After completing blocks S112 and S114, the dip-coating process (block S116) is performed to manufacture a CNT plus transition-metal composite assembly. In the descriptions of the dip-coating process given below, it is assumed that the tungsten tip and the CNT plus Ni colloidal solution are used as the metal tip and the CNT plus transition-metal colloidal solution, respectively.

Figure 4:
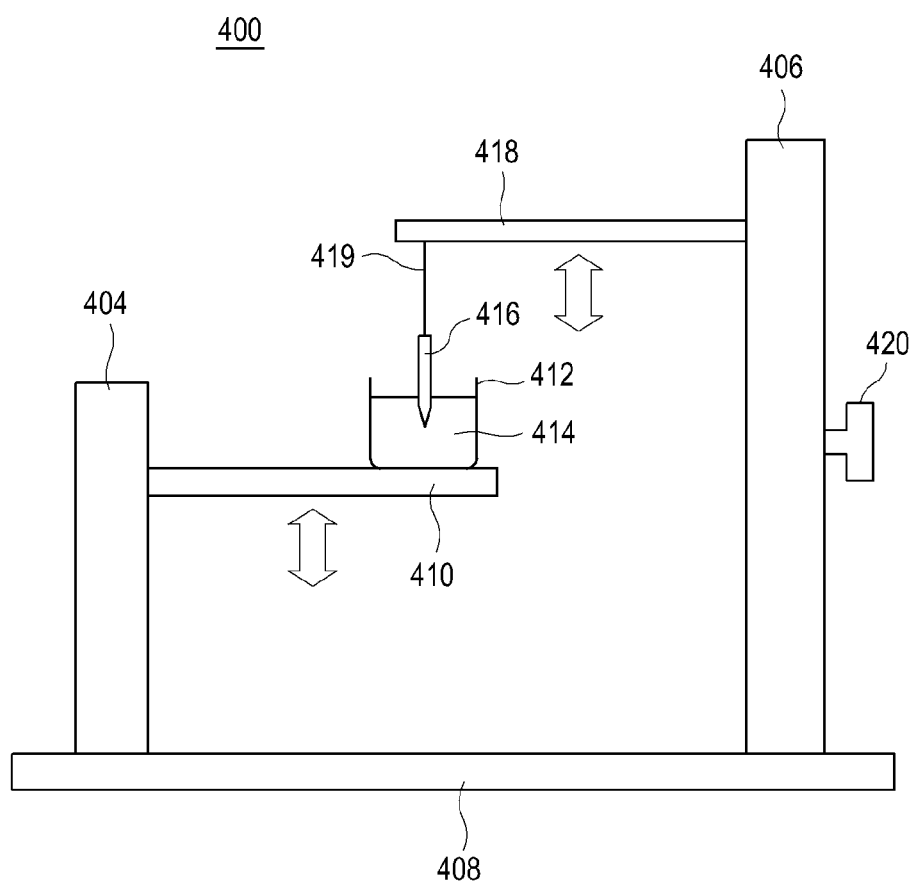
FIG. 4 shows an experimental apparatus used in a dip-coating process in one embodiment.

FIG. 4 is a schematic drawing showing a structure of an experimental apparatus 400 used for the dip-coating process in one embodiment. As depicted, the apparatus 400 may comprise a motor (not shown), a left guider 404 and a right guider 406, which are mounted on a base 408. A supporting member 410 may be movably attached to the left guider 404 so that the supporting member 410 may be moved upwardly and downwardly by the operation of the motor. A vessel 412 may be adapted to receive a CNT plus Ni colloidal solution 414 and may be placed on the supporting member 410. In one embodiment, the vessel 412 may be made from, for example, a hydrophobic material such as Teflon. A hanger 418 may be mounted to the right guider 406 such that the hanger 418 can move upwardly and downwardly by the operation of a manipulator 420. The hanger 418 may suspend a tungsten tip 416 through a holder 419 so that the movement of the hanger 418 may cause the tungsten tip 416 to be maintained as being immersed in the CNT plus Ni colloidal solution 414.

The dip-coating process comprises two stages, i.e., a dipping stage and a withdrawal stage. In the dipping stage, the tungsten tip 416 is immersed in the CNT plus Ni colloidal solution. For example, the manipulator 420 may be operated by an operator to move the hanger 418 so that the tungsten tip 416 is immersed in the CNT plus Ni colloidal solution 414. In one embodiment, the tungsten tip 416 may be immersed in the CNT plus Ni colloidal solution for a few minutes.

Subsequently, in the withdrawal stage, as the supporting member 410 moves downward at a constant speed, the tungsten tip 416 is pulled off from the CNT plus Ni colloidal solution 414 at a constant withdrawal velocity ($V_w$). In one embodiment, the motor may be driven by an operator so that the supporting member 410 moves along the left guider 404. As such, the supporting member 410 may move downward at a predetermined speed. Thus, the tungsten tip 416 can be pulled out from the CNT plus Ni colloidal solution 414. In one embodiment, $V_w$ may be 3 mm/min. However, $V_w$ is not limited thereto. In one embodiment, the entire operations of the apparatus 400 in the dip coating process may be automated without any intervention from an operator. In such a case, the immersing depth, immersing time, withdrawal velocity ($V_w$), etc. may be adjusted by a suitable program set in the apparatus 400.

Figure 5:
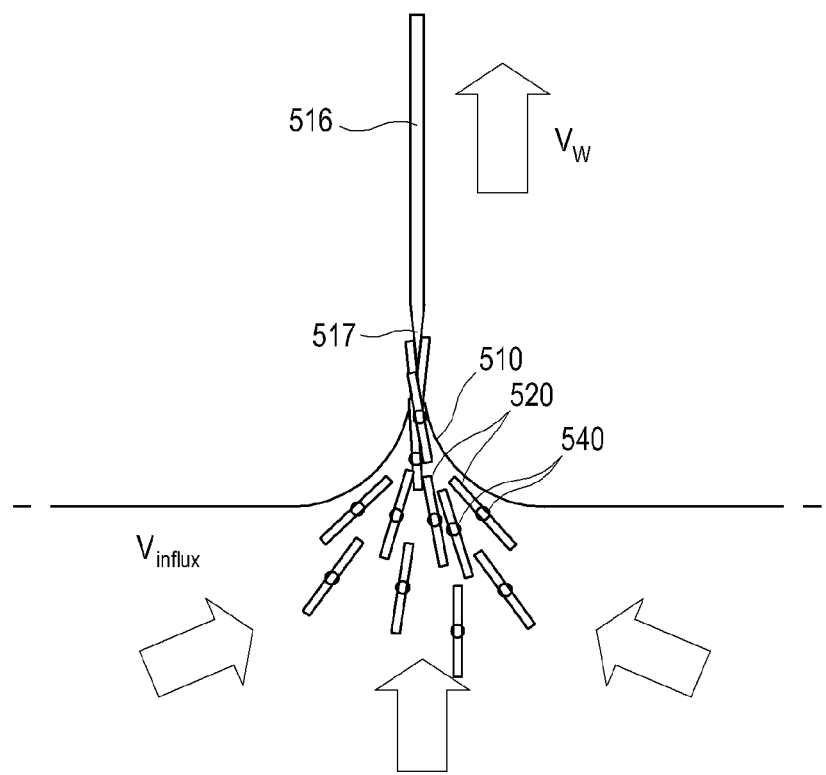
FIG. 5 shows a conceptual view illustrating how a CNT plus Ni composite assembly is manufactured in one embodiment.

FIG. 5 shows a conceptual view illustrating how the CNT plus Ni composite assembly is manufactured in one embodiment. A conical-shaped meniscus 510 is generated by (i.e., due to) the interfacial energy differences among air, tungsten tip and CNT plus Ni colloidal solution. Because of the meniscus 510, an influx flow ($V_{influx}$) of CNT colloids 520 and Ni particles 540 occurs toward a tungsten tip 516. The CNT colloids 520 and the Ni particles 540 induced by capillary action adhere to an apex 517 of the tungsten tip 516. As the tungsten tip is pulled out from the solution, the CNT plus Ni composite assembly is extended at the end of the tungsten tip.

Figure 6:
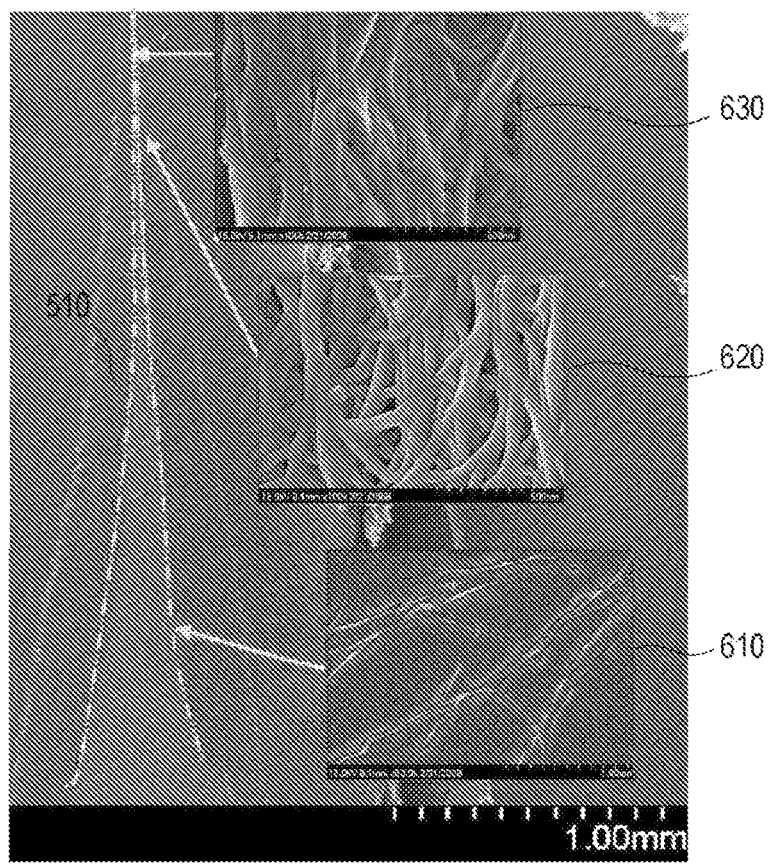
FIG. 6 is a picture obtained using a scanning electron microscope showing SWNT colloid distribution within meniscus in one embodiment.

FIG. 6 is a picture obtained using a scanning electron microscope showing SWNT colloid distribution within meniscus in one embodiment. As illustrated in a box 610, CNTs are dispersed in the SWNT colloids in a disorderly fashion around the edge of the meniscus. However, CNTs are gradually aligned around the center of the meniscus, as shown in boxes 620 and 630 (for simplicity, an illustration of Ni particles is omitted from FIG. 6). The aligned CNTs and Ni particles adhere together due to the van der Waals forces, thereby forming the CNT plus Ni composite assembly.

Figure 7:
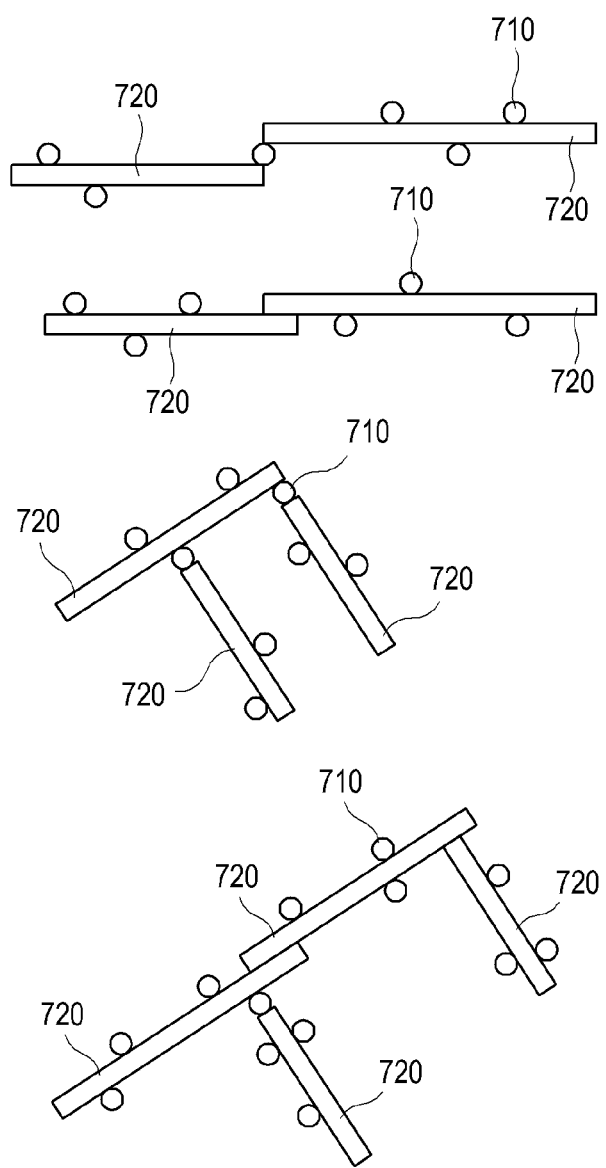
FIG. 7 shows various examples of a CNT plus Ni composite assembly formed by withdrawing in one embodiment.

FIG. 7 shows various examples of the CNT plus Ni composite assembly manufactured by withdrawing in one embodiment. The CNT plus transition-metal composite assembly (e.g., CNT plus Ni composite rope) includes a large number of CNTs and Ni particles. CNT-Ni or CNT-CNT is bounded by the van der Waals forces. In the CNT plus Ni composite assembly, Ni particles 710 are generally evenly positioned on CNTs 720. The CNT plus transition-metal composite assembly may have various forms, which include, but are not limited to, a rope, a ribbon, a film, a fiber, a strand and the like.

In some embodiments, the CNT plus Ni composite assembly may have a length of about 1 cm and a diameter of about 10 μm. The length of the CNT plus Ni composite assembly may be extended to, for example, approximately 10 cm in the presence of a sufficient amount of the CNT plus Ni colloidal solution. Multiple processes for manufacturing the CNT plus transition-metal composite assembly may be performed in parallel when the apparatus 400 includes multiple vessels and metal tips. By doing so, it becomes possible to mass-produce the CNT plus transition-metal composite assemblies in a simple and efficient manner.

Growing Block

Following the dip-coating process at block S116, a growing process (block S118) is conducted to grow a CNT plus transition-metal composite assembly. The growing of the CNT plus transition-metal composite assembly may be carried out using any one of the conventional methods known to those of ordinary skill in the art such as the arc discharge method, laser ablation method, CVD method, etc. In one embodiment, the CNT plus transition-metal composite assembly may be grown by using the thermal CVD (chemical vapor deposition) method. In this embodiment, the CNT plus transition-metal composite assembly that is manufactured from the dip-coating process and that has been separated from the metal tip is placed on a reaction vessel within a CVD chamber. In another embodiment, the CNT plus Ni composite assembly with the metal tip attached thereto may be placed on the reaction vessel. In either case, the reaction vessel may be evacuated to a predetermined pressure of about 1 Pa. The CNT plus Ni composite assembly is then heated by a heating means such as an infrared lamp and stabilized at a predetermined temperature. Ni particles may melt and reflow at a growth temperature due to its bulk property. Thereafter, a feeding gas is introduced into the reaction vessel. A carbon-combining mixture gas, for example, $C_xH_y$, CO, etc., may be used as the feeding gas. The CNT plus Ni composite assembly is held in the reaction vessel for a predetermined period of time. CNTs within the CNT plus Ni composite assembly are grown from the Ni catalyst, which is coated on the surface of the CNT plus Ni composite assembly. In such a case, if a transition metal other than Ni is used for the assembly, then the transition metal may act as a catalyst. Through this process, the CNT plus Ni composite assembly can be grown as an enhanced CNT.

Figure 8:
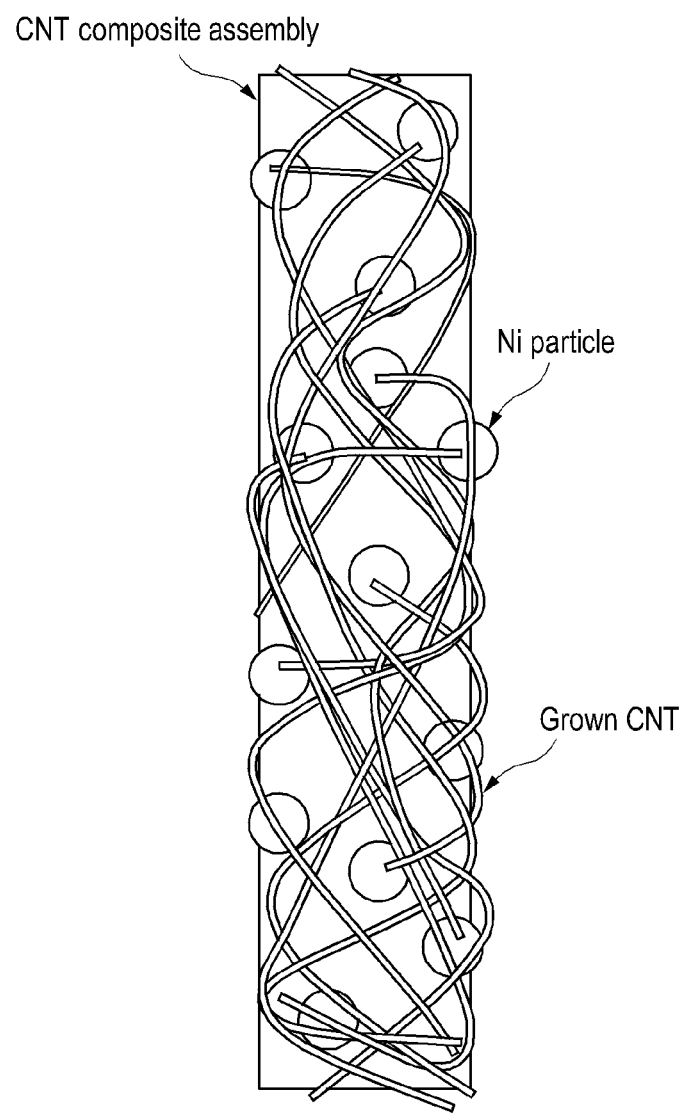
FIG. 8 shows one example of an enhanced CNT manufactured in one embodiment.

FIG. 8 shows one example of an enhanced CNT manufactured in one embodiment. In the enhanced CNT as shown, Ni particles seize CNTs, which in turn become tangled around the Ni particles. As a result, CNTs are strongly interconnected and acquire an enhanced mechanical property compared to a conventional CNT rope.

In light of the present disclosure, those skilled in the art will appreciate that the apparatus and methods described herein may be implemented in hardware, software, firmware, middleware or combinations thereof and utilized in systems, subsystems, components or sub-components thereof. For example, a method implemented in software may include computer code to perform the operations of the method. This computer code may be stored in a machine-readable medium such as a processor-readable medium or a computer program product, or transmitted as a computer data signal embodied in a carrier wave, or a signal modulated by a carrier, over a transmission medium or communication link. The machine-readable medium or processor-readable medium may include any medium capable of storing or transferring information in a form readable and executable by a machine (e.g., by a processor, a computer, etc.).

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method of manufacturing an enhanced carbon nanotube (CNT) assembly, comprising:
    forming a CNT composite assembly comprising CNTs and particles of a transition metal, wherein forming the CNT composite assembly comprises:
        providing a solution of CNTs plus transition-metal colloidal solution and dipping a metal tip into the solution;
        adhering carbon nanotubes to the metal tip; and
        withdrawing the metal tip from the CNT plus transition-metal colloidal solution so that the CNT composite assembly extends from the metal tip to CNT plus transition-metal colloidal solution, wherein the CNT composite assembly is formed without applying a voltage between the metal tip and the CNT colloidal solution; and
    growing the CNT composite assembly, wherein growing the CNT composite assembly comprises a process selected from the group consisting of chemical vapor deposition, laser ablation and arc discharge,
    wherein the growth of the CNT composite assembly is facilitated by the particles of the transition metal.

2. The method of claim 1, further comprising:
    maintaining the metal tip immersed in the CNT plus transition-metal colloidal solution for a predetermined time.

3. The method of claim 1, wherein withdrawing the metal tip from the CNT plus transition-metal colloidal solution comprises withdrawing the metal tip from the CNT plus transition-metal colloidal solution at a predetermined withdrawal velocity.

4. The method of claim 1, wherein the enhanced CNT assembly has a form selected from the group consisting of a rope, a ribbon, a film, a fiber and a strand.

5. The method of claim 1, wherein growing the CNT composite assembly comprises growing the CNT composite assembly using a chemical vapor deposition method.

6. The method of claim 1, wherein the metal tip comprises a metal select from the group consisting of tungsten, a tungsten alloy, platinum, and a platinum alloy.

7. The method of claim 1, wherein the metal tip has an apex with a conical shape.

8. The method of claim 1, wherein the metal tip is obtained by electrochemical etching.

9. The method of claim 1, wherein the transition metal is selected from the group consisting of Ni, Co, and Fe.

10. The method of claim 3, where the predetermined withdrawal velocity is about 3 mm/min.

11. The method of claim 1, wherein the particles of the transition metal are evenly distributed on the CNTs in the CNT composite assembly.

12. The method of claim 1, wherein the CNT composite assembly has a diameter of about 10 μm after withdrawing the metal tip.

13. The method of claim 1, wherein growing the CNT composite assembly comprises laser ablation.

14. The method of claim 1, wherein growing the CNT composite assembly comprises arc discharge.

15. The method of claim 1, wherein growing the CNT composite assembly comprises:
- disposing the CNT composite assembly in a reaction vessel after withdrawing the metal tip; and
- exposing the CNT composite assembly in the reaction vessel to a carbon-containing gas to yield new carbon nanotubes on the CNT composite assembly, wherein the particles of transition metal in the CNT composite assembly catalyze growth of the new carbon nanotubes from the carbon-containing gas.

16. A method of forming a CNT assembly consisting of:
- providing a solution of CNTs plus transition-metal colloidal solution and dipping a metal tip into the solution;
- adhering carbon nanotubes to the metal tip; and
- withdrawing the metal tip from the CNT plus transition-metal colloidal solution so that the CNT composite assembly extends from the metal tip to CNT plus transition-metal colloidal solution.

17. A method of manufacturing an enhanced carbon nanotube (CNT) assembly, comprising:
- forming a CNT composite assembly comprising CNTs and particles of a transition metal, wherein forming the CNT composite assembly consists of:
  - providing a solution of CNTs plus transition-metal colloidal solution and dipping a metal tip into the solution;
  - adhering carbon nanotubes to the metal tip; and
  - withdrawing the metal tip from the CNT plus transition-metal colloidal solution so that the CNT composite assembly extends from the metal tip to CNT plus transition-metal colloidal solution; and
- growing the CNT composite assembly, wherein growing the CNT composite assembly comprises a process selected from the group consisting of chemical vapor deposition, laser ablation and arc discharge,
- wherein the growth of the CNT composite assembly is facilitated by the particles of the transition metal.

* * * * *

UNITED STATES PATENT AND TRADEMARK OFFICE
CERTIFICATE OF CORRECTION

PATENT NO. : 8,673,258 B2
APPLICATION NO. : 12/192024
DATED : March 18, 2014
INVENTOR(S) : Kim et al.

It is certified that error appears in the above-identified patent and that said Letters Patent is hereby corrected as shown below:

On Title Page 2, item (56), under "OTHER PUBLICATIONS", in Column 2, Line 2, delete "functonalize" and insert -- functionalize --, therefor.

On Title Page 2, item (56), under "OTHER PUBLICATIONS", in Column 2, Line 3, delete "Physicas" and insert -- Physicals --, therefor.

In the Claims:

In Column 6, Line 60, in Claim 10, delete "where" and insert -- wherein --, therefor.

Signed and Sealed this
First Day of July, 2014

Michelle K. Lee
*Deputy Director of the United States Patent and Trademark Office*